United States Patent [19]

Zinser et al.

[11] Patent Number: 5,097,507
[45] Date of Patent: Mar. 17, 1992

[54] FADING BIT ERROR PROTECTION FOR DIGITAL CELLULAR MULTI-PULSE SPEECH CODER

[75] Inventors: Richard L. Zinser, Schenectady; Steven R. Koch, Waterford; Raymond L. Toy, Latham, all of N.Y.

[73] Assignee: General Electric Company, Schenectady, N.Y.

[21] Appl. No.: 455,047

[22] Filed: Dec. 22, 1989

[51] Int. Cl.$^5$ .............................................. G10L 5/00
[52] U.S. Cl. ........................................ 381/31; 381/46; 381/47; 371/31; 371/37.7
[58] Field of Search ................................ 381/29–41, 381/46–47; 364/513.5; 375/26, 34; 371/31

[56] References Cited

U.S. PATENT DOCUMENTS

| | | | |
|---|---|---|---|
| 4,688,224 | 8/1987 | Dal Degan et al. | 381/46 |
| 4,776,015 | 10/1988 | Takeda et al. | 364/513.5 |
| 4,802,171 | 1/1989 | Rasky | 381/46 |
| 4,831,624 | 5/1989 | McLaughlin et al. | 381/46 |

OTHER PUBLICATIONS

B. S. Atal et al., "A New Model of LPC Excitation for Producing Natural Sounding Speech at Low Bit Rates", *Proc. of 1982 IEEE Int. Conf. on Acoustics, Speech and Signal Processing*, May 1982, pp. 614–617.

N. Dal Degan et al., "Communications by Vocoder on a Mobile Satellite Fading Channel", *Proc. of the IEEE International Conference on Communications*, Jun., 1985, pp. 771–775.

N. Sugamura et al., "Quantizer Design in LSP Speech Analysis-Synthesis", *IEEE Journal of Selected Areas in Communications*, vol. 6, No. 2, Feb. 1988, pp. 432–440.

J. Max, "Quantizing for Minimum Distortion", *IRE Transactions on Information Theory*, Mar. 1960, pp. 7–12.

*Primary Examiner*—Emanuel S. Kemeny
*Attorney, Agent, or Firm*—Lawrence P. Zale; James C. Davis, Jr.; Marvin Snyder

[57] ABSTRACT

Protection of a digital multi-pulse speech coder from fading pattern bit errors common in a digital mobile radio channel is accomplished with error detection techniques which are simple to implement and require no error correcting codes. A synthetic regeneration algorithm is employed which uses only the perceptually significant bits in the transmitted frame. Separate parity checksums for line spectrum pair frequency data, pitch lag data and pulse amplitude data are added to each frame of speech coder bits in the transmitter. The bits are then transmitted through a mobile environment susceptible to fading that induces bursty error patterns in the stream. At the receiving station, the parity checksum bits and speech coder bits are used to determine if an error has occurred in a particular section of the bit stream. Detected errors are flagged and supplied to the speech decoder. The speech decoder uses the error flags to modify its output signal so as to minimize perceptual artifacts in the output speech. Separate checksums are developed for subsets of line spectrum pair (LSP) coefficients and related speech data, whereby a single subset may be error-detected and replaced, rather than an entire frame.

14 Claims, 5 Drawing Sheets

FADING BIT ERROR PROTECTION FOR DIGITAL CELLULAR MULTI-PULSE SPEECH CODER

CROSS-REFERENCE TO RELATED APPLICATIONS

The invention described in this application is related to subject matter to the inventions disclosed in U.S. patent applications Ser. No. 07/353,855 filed May 18, 1989 by R.L. Zinser entitled "Hybrid Switched Multi-Pulse/Stochastic Speech Coding Technique", Ser. No. 07/353,856 filed May 18, 1989 by R.L. Zinser entitled "A Method for Improving the Speech Quality in Multi-Pulse Excited Linear Predictive Coding, and Ser. No. 07/441,022 filed Nov. 24, 1989 by R.L. Zinser et al. entitled "A Method for Protecting Multi-Pulse Coders from Fading and Random Pattern Bit Errors". Those applications are assigned in common to the instant assignee and the disclosures thereof are incorporated herein by reference.

BACKGROUND OF THE INVENTION

1. Field of the Invention

The present invention generally relates to digital cellular multi-pulse speech coders and, more particularly, to a fading bit error protection scheme for such coders.

2. Description of the Prior Art

Code Excited Linear Prediction (CELP) and Multi-pulse Linear Predictive Coding (MPLPC) are two of the most promising techniques for low rate speech coding. While CELP holds the most promise for high quality, its computational requirements can be too great for some systems. MPLPC can be implemented with much less complexity, but it is generally considered to provide lower quality than CELP.

Multi-pulse coding is believed to have been first described by B.S. Atal and J.R. Remde in "A New Model of LPC Excitation for Producing Natural Sounding Speech at Low Bit Rates", *Proc. of 1982 IEEE Int. Conf. on Acoustics, Speech. and Signal Processing*, May 1982, pp. 614-617. It was described to improve on the rather synthetic quality of speech produced by the standard U.S. Department of Defense LPC-10 vocoder. The basic method is to employ the Linear Predict Coding (LPC) speech synthesis filter of the standard vocoder, but to use multiple pulses per pitch period for exciting the filter, instead of the single pulse used in the Department of Defense standard system. The basic multi-pulse technique is illustrated in FIG. 1.

The digital cellular mobile radio environment exhibits a severe bit error effect known as the fading error. Fading errors occur when the moving vehicle encounters an area where the direct and reflected signals combine destructively and produce little or no signal level at the receiver. Such fades occur in a quasi-periodic fashion, where the time between fades and duration of fades depend on the vehicle speed, transmission rate, and carrier frequency. During a fade, all information is lost, and a random stream of bits is sent to the speech decoder. Thus, the speech decoder receives occasional bursts of an effective 50% bit error rate (BER). These bursts produce severe short-term "whoop" and "splat" artifacts in the output speech. Conventional error protection schemes (such as convolutional coding) cannot protect against most fades.

If a means for detecting fade occurrence is provided, then some degree of fade protection can be provided by taking "evasive action" within the speech decoding algorithm. Systems to accomplish such result take advantage of the quasi-stationary and periodic nature of the speech signal by interpolating or holding over spectral and gain information from a previous usable or "good" frame. Such system is described by N. Dal Degan et al. in "Communications by Vocoder on a Mobile Satellite Fading Channel", *Proceedings of the IEEE International Conference on Communications*, June 1985, pp. 771-775, for a standard LPC-10 vocoder. The Dal Degan et al. method detects fades using what they characterize as a "Signal Quality Detector" and by estimating the LPC distance between contiguous frames. Presumably, if the quality detector indicates an unusable or "bad" frame and the LPC distance measure between the "bad" frame and the previous "good" frame is above a threshold, the algorithm will reuse the previous frame's LPC coefficients; or, if a faded frame occurs between two "good" frames, it will interpolate the LPC values from the surrounding frames for the "bad" frame. While the Dal Degan et al. algorithm also interpolates (or holds over) values for the pitch period and the gain, it utilizes a signal level measurement, instead of a more exact error detection scheme, to indicate presence of a deep fade and does not provide adequate protection during periods of random pattern errors.

Methods are available to actually correct, rather than just detect, fading or burst errors. One method widely known employs Reed-Solomon coding on compact disc players for this purpose. While the performance of this code is very good, it has two drawbacks: 1) a very high overhead rate (i.e., high system complexity) is required for good performance under specified conditions, and 2) the fade length that can be corrected is limited. Drawback 2 becomes more important when high transmission rates are used and/or VHF carrier frequencies are used. For these reasons, the Reed-Solomon coding scheme may not be appropriate for Cellular or Public Service Trunked mobile radio.

SUMMARY OF THE INVENTION

It is therefore an object of the present invention to provide a scheme for protecting a digital multi-pulse speech coder against fading pattern bit errors common in a digital mobile radio channel.

Another object of this invention is to provide error detection techniques for linear predictive vocoders which are inexpensive to implement and require no error correcting codes.

In a preferred embodiment, the invention contemplates employment of a synthetic regeneration algorithm which uses only the bits in the transmitted frame that are perceived to be significant, or the "perceptually significant" bits. More specifically, parity checksum bits are added to each frame of speech coder bits in the transmitter. The bits are then transmitted through a mobile fading environment which induces bursty error patterns in the stream. In the receiver, the parity checksum bits and speech coder bits are used to determine if an error has occurred in a particular section of the bit stream. Detected errors are flagged, and this information is transmitted to the speech decoder. The speech decoder uses the error flags to modify its output signal such that perceptual artifacts in the output speech are minimized. Multiple checksums are used per frame; specifically, seven checksums are employed, three for line spectrum pair frequencies (LSPFs), one for pitch data, and one each for each of three subframes for pulse position and amplitude data. The use of multiple checksums provides improved performance during fades and during periods of heavy random errors.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

DETAILED DESCRIPTION OF A PREFERRED EMBODIMENT OF THE INVENTION

Figure 1:
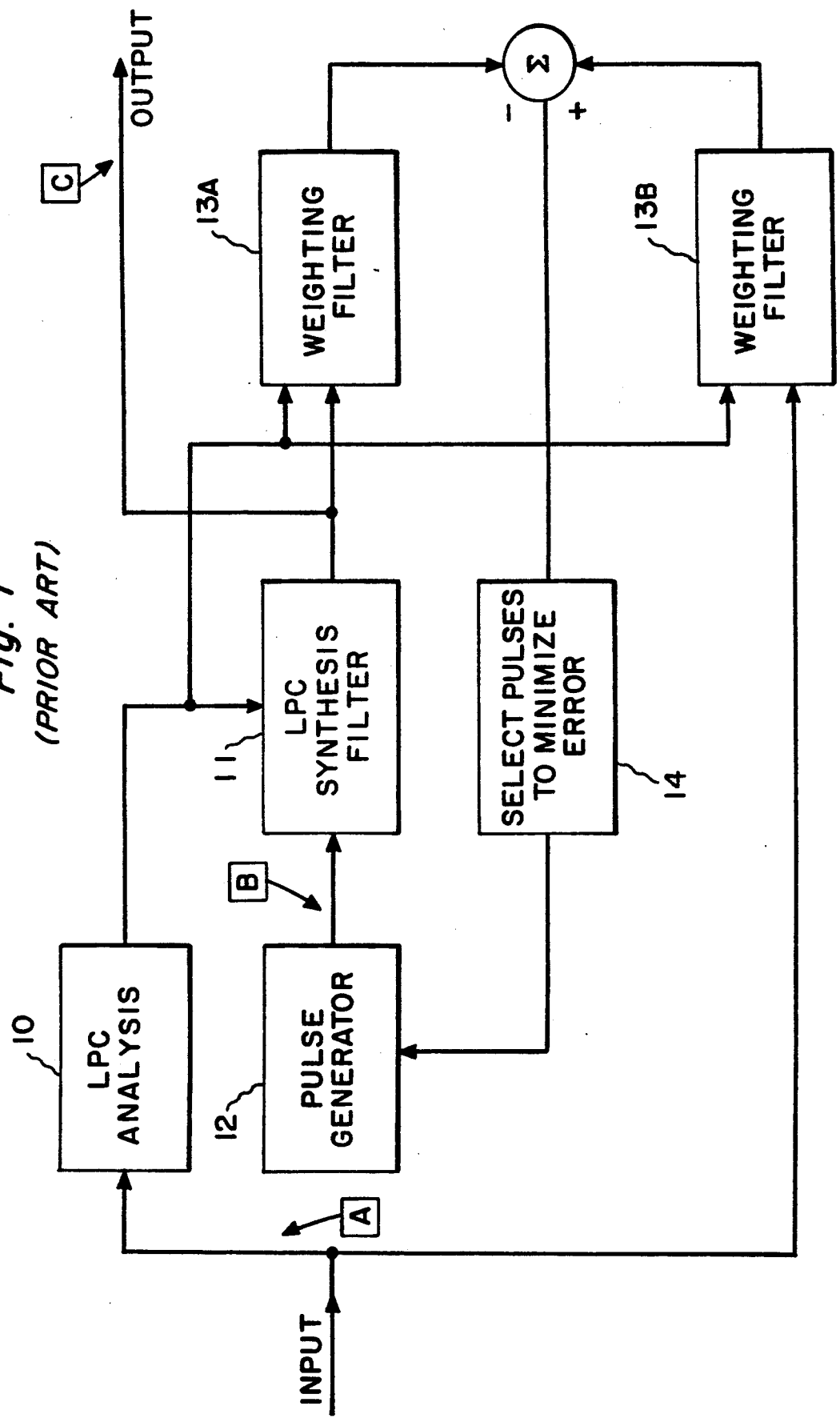
FIG. 1 is a block diagram showing implementation of the basic multi-pulse technique for exciting the speech synthesis filter of a standard voice coder.
Figure 2:
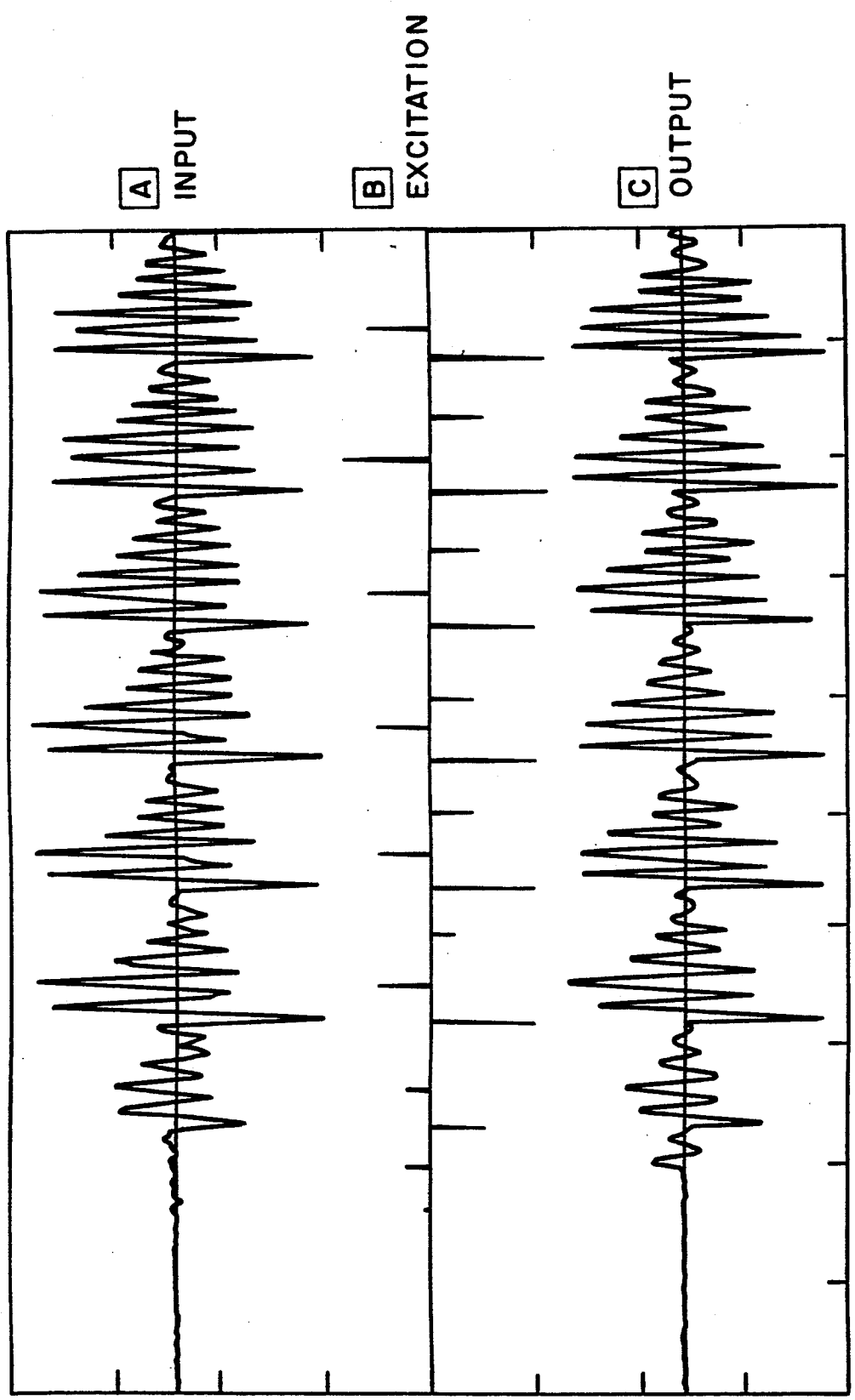
FIG. 2a is a graph showing a typical voice input signal.
FIG. 2b is an excitation signal derived from the input signal shown in FIG. 2a by a conventional multi-pulse vocoder as shown in FIG. 1.
FIG. 2c shows an output signal constructed by the vocoder shown in FIG. 1 using the excitation signal of FIG. 2b.

In employing the basic multi-pulse technique, as shown in FIG. 1, the input signal at A (shown in FIG. 2) is first analyzed in a linear predictive coding (LPC) analysis circuit 10 to produce a set of linear prediction filter coefficients called line spectrum pair frequency coefficients. These coefficients, when used in an all-pole LPC synthesis filter 11, produce a filter transfer function that closely resembles the gross spectral shape of the input signal. A feedback loop formed by a pulse generator 12, synthesis filter 11, weighting filters 13A and 13B, and an error minimizer 14 generates a pulsed excitation at point B that, when fed into filter 11, produces an output waveform at point C that closely resembles the input waveform at point A. This is accomplished by selecting the pulse positions and amplitudes to minimize the perceptually weighted difference between the candidate output sequence and the input sequence. Trace B in FIG. 2 depicts the pulse excitation for filter 11, and trade C shows the output signal of the system. The resemblance of signals at input A and output C should be noted. Perceptual weighting is provided by the weighting filters 13A and 13B. The transfer function of these filters is derived from the LPC filter coefficients. A more complete understanding of the basic multi-pulse technique may be gained from the aforementioned Atal et al. paper.

Speech coder data that are classified for fade protection are divided into two groups: spectral and pitch lag data which are sent once per 192 sample (24 millisecond) frame, and excitation and pitch tap gain data which are sent three times per frame, or three and frames per frame. The excitation and pitch tap gain represents one 64 sample (8 millisecond) subframe of speech. The spectral data is comprised of ten LPC filter coefficients. It would be a simple matter to directly quantize these coefficients and send them to the receiver over the fading channel, but their performance is very poor in environments of 0.5% bit error rates (BER) or greater. Instead, the set of LPC coefficients is first translated into ten line spectrum pair frequencies (LSPF). The LSPFs have much better tolerance to bit errors than the standard LPC coefficients and also possess other properties that are exploitable by the synthetic regeneration algorithm utilized in the invention. A complete discussion of LPC coefficient/line spectrum pair conversion algorithms is provided by N. Sugamura et al. in "Quantizer Design in LSP Speech Analysis-Synthesis", *IEEE Journal of Selected Areas in Communications*, vol. 6, no. 2, Feb. 1988, pp. 432–440.

Figure 3:
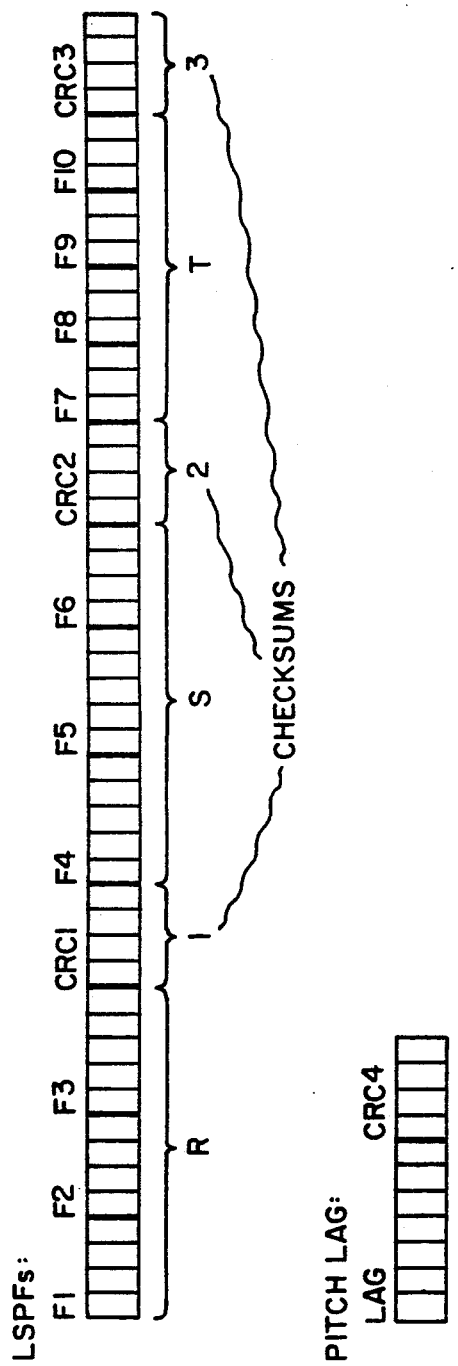
FIG. 3 is a diagram showing the format of the frame according to the invention, including the bits transmitted, per frame, to a multi-pulse receiver.
Figure 3:
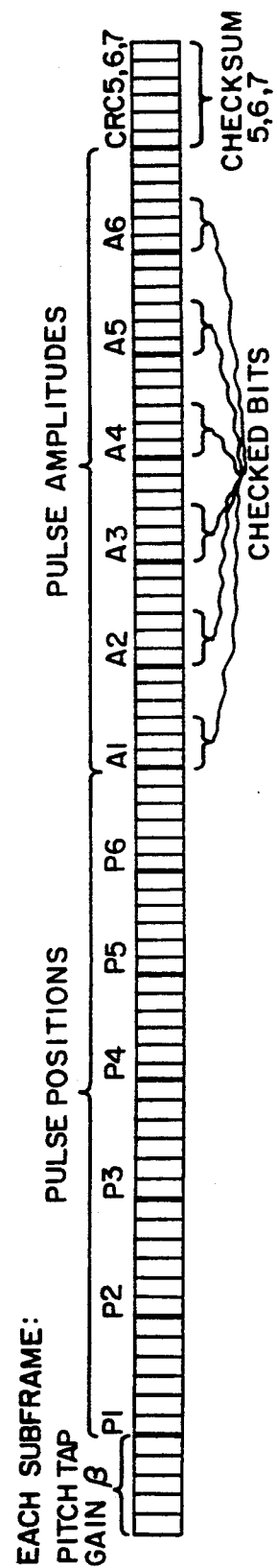

For transmission, each LSPF is independently quantized according to an optimal Lloyd-Max characteristic derived from a speech database. The Lloyd-Max characteristic is described by J. Max in "Quantizing for Minimum Distortion", *IRE Transactions on Information Theory*, March 1960, pp. 7–12. Thirty-nine bits are allocated for transmission of the ten frequencies; the individual allocation to quantize a particular frequency is given in Table 1 and the frame format is shown in FIG. 3. These allocations have been optimized for high quality speech production.

TABLE 1

| Bit Allocation for Multipulse Coder | | |
|---|---|---|
| LSPF data | Frequency 1 | 4 bits |
| | Frequency 2 | 4 bits |
| | Frequency 3 | 5 bits |
| | Frequency 4 | 5 bits |
| | Frequency 5 | 5 bits |
| | Frequency 6 | 4 bits |
| | Frequency 7 | 3 bits |
| | Frequency 8 | 3 bits |
| | Frequency 9 | 3 bits |
| | Frequency 10 | 3 bits |
| Total LSPF bits/frame | | 39 bits |
| Pitch Lag | | 7 bits |
| Subframe data | Pitch Tap Gain ($\beta$) | 5 bits |
| | Amplitudes (6 × 6 bits) | 36 bits |
| | Positions (6 × 6 bits) | 36 bits |
| Total bits/subframe | | 77 bits |
| Total excitation bits/frame (3 × 77) | | 231 bits |
| Total number of bits/frame | | 277 bits |
| Total rate of coder (24 msec frame) | | 11541.667 b/sec |

Like the LSPFs, the pitch lag data is updated once per 24 millisecond frame. The pitch lag, an integer number between 32 and 120, is transmitted in its 7-bit binary equivalent form.

The excitation and pitch tap gain data are updated with each 64 sample, or excitation subframe, i.e., every 8 milliseconds. The excitation subframe comprises six pulse positions, six pulse amplitudes, and the pitch tap gain data. This data specifies the excitation that will be fed to an all-pole filter formed by decoding the LSPFs back into LPC coefficients. Pulse positions, identified by integer numbers between 0 and 63 which represent the actual position of the pulse within the 64 sample excitation subframe, are sent in their 6-bit binary equivalent form. Pulse amplitudes are nonuniformly quantized using a Lloyd-Max characteristic data-derived scalar quantizer, with each amplitude allotted six bits. The pitch tap gain data is also quantized with a Lloyd-Max quantizer using five bits. The total number of bits for each subframe is 77. Thus 231 bits per frame are used for excitation and pitch tap gain data information. If the pitch lag and LPC data are included, a total of 277 bits per frame are transmitted.

The effect of bit errors on the output speech quality depends on the coefficient that is perturbed by the error and the significance of the individual bit perturbed within that coefficient. For example, one might expect that bit error in the most significant bit of pulse amplitude creates more havoc in the output signal than an error in the least significant bit of the pulse position. This is indeed true. The problem is to determine which group of bits requires the most "protection". Actually, the invention does not protect bits from errors but instead provides an error detection scheme. Thus the bits that are most sensitive to errors must be determined, and then the knowledge of an error occurrence must be applied in order to synthesize a value for the corresponding incorrectly decoded coefficient.

Copending application Ser. No. 07,441,022 describes a system that selects the most sensitive bits for a general case multi-pulse speech coder. The present invention improves on that system by providing a facility to select bits for error detection. Previously, it was found that the most significant bits in the pulse amplitude, pitch lag and LSPF values were the most sensitive. It was also previously found that the least significant bits in the pulse amplitude values were not very important, and that the least significant bits in the LSPF values were not important on an individual basis but warranted "protection" as a group to minimize artifacts in the output signal. All of the pitch lag bits were found to be significant. For this invention, these three coefficient sets (i.e. pulse amplitude, pitch lag and LSPF) and their corresponding bits are the ones in which error detection is applied.

The time between, and duration of, fading error bursts depends on the digital transmission rate, radio frequency (RF) carrier frequency, and vehicle speed, with vehicle speed being the predominant factor in determining those intervals. A slow moving vehicle (e.g., 5 mph) will produce fades that corrupt one or more frames with a single fade, while a fast moving vehicle (e.g., 60 mph) could produce several fades during a single frame. The system must accommodate both ends of the vehicle speed spectrum. A system for a slow vehicle would require only one checksum per frame because a fade would be expected to corrupt the entire frame; however, using a one-checksum-per-frame system with a vehicle operated at high speed would produce poor results because entire frames would be flagged as corrupted when only small segments were bad. Therefore, the invention uses multiple checksums per frame, covering independent coefficients with different checksums that are situated in appropriately time-spaced segments. A small penalty in overhead for the additional checksums is incurred, but the improved performance at high vehicle speeds makes this a desirable trade-off.

To detect fading errors, three checksums are utilized to cover different parts of the transmitted frame. The checksums are of four bit and six bit, lengths and are based on cyclic redundancy codes (CRCs). The checksums here refer to a conventional cyclic redundancy code (CRC) which is the remainder of a polynomial long division of a generator polynomial into the protected bits whereas parity bits refer to a modulo-2 sum of subsets of protected bits. Each of these sums is capable of detecting any single error and any odd number of errors. The code of length four bits detects all double errors up to a message of length seven bits, all single burst errors of length less than four bits, 87.5% of the bursts of length five bits, and 93.7% of the bursts of length greater than five bits. Similarly, the code of length six bits detects all double errors up to a message length of thirty-one bits, all burst errors of length less than six bits, 96.9% of the bursts of length seven bits, and 98.4% of the bursts of length greater than seven bits. Therefore, the chance of a missed detection with the sums of length six bits is fairly small. The polynomials for computing these checksums are given in the table below.

| CRC POLYNOMIALS FOR FADE DETECTION | | |
|---|---|---|
| CRC length | Use in algorithm | Polynomial |
| 4 bits | LSPFs and pitch lag | $x^4 + x^3 + x^2 + 1$ |
| 6 bits | pulse amplitudes | $x^6 + x^2 + x^1 + 1$ |

For effective synthetic regeneration of the sensitive coefficients, effective replacement algorithms must be devised for times when checksums indicate errors have occurred. The replacement algorithms depend on the individual properties of each coefficient.

The transfer function of the LPC synthesis filter given by the LSPFs is fairly stationary; i.e., it changes slowly from frame to frame. Thus an effective replacement strategy is to use the most recently received error-free set of LSPFs to replace a set that is flagged as corrupted. However, the nature of the LSPF information is such that the introduction of a small number of bit errors, e.g., one or two, can usually be tolerated and will not cause highly objectionable artifacts in the output speech. Protection of the line spectrum pair information is designed to take advantage of their intrinsic robustness, while still reliably detecting and countering the bursts of errors that will occur during fades.

To counter bursts of errors, the LSPFs are protected by three checksums, i.e., the set of bits is divided into three roughly equal parts R, S and T, and a 4-bit checksum is applied to each as shown in FIG. 3. A single 4-bit checksum is unable to detect a fair percentage of possible bit error patterns. However, the three 4-bit checksums taken as a whole perform very well; specifically, when a burst of errors hits the LSPF information, two out of the three checksums will almost always detect the error. The LSPF set is therefore replaced whenever at least two of the three checksums have been tripped.

When one or no checksum has been tripped, a consistency check is applied to the LSPFs. This check takes advantage of the fact that the frequencies within a set must be strictly increasing in order to produce a stable synthesis filter. Also checked are frequencies which are "too close" to each other, as this results in tonal artifacts in the output speech. This consistency check actually adjusts for misorderings resulting from both quantization and bit errors and is applied at both the transmitter and the receiver. The meaning of "too close" varies with frequency and has been determined empirically.

The consistency check is performed by stepping through the LSPF set to locate adjacent LSPFs that are either overlapping or too close together. Line spectrum pairs that are too close together in frequency are separated out to a minimum distance. Line spectrum pairs that overlap in frequency are replaced with their values from the previous frame. Either corrective measure can result in new overlap or closeness problems, so the process backs up by one line spectrum pair in the set and continues checking. A maximum of two such fixes of either type is allowed before the entire LSPF set is replaced.

Pitch lag is similar to LSPF information in that it varies slowly from frame to frame. If an error is detected in the pitch lag, it is replaced with the most previously received error-free value.

Pulse amplitudes exhibit none of the stationary properties inherent in the LSPF information or pitch lag data. Therefore, a simple replacement with previous values will not work. In fact, in a coder with pitch prediction, it is difficult to use any previous information to predict the pulse amplitudes. Complicating the problem is the fact that if the pulse amplitudes have been corrupted by a fade, the pulse positions have probably been corrupted also, due to their close proximity in the transmitted frame. Finally, it is known that errors in the pulse amplitude information are responsible for the loudest and most perceptibly annoying artifacts in the output speech. Therefore, the best course of action, given detected errors in the pulse amplitudes, would be to suppress any excitation that would have been generated by the corrupted values. In other words, the protection algorithm would zero the pulse amplitudes when errors are detected in them. Unfortunately, this action has the effect of putting "smooth holes" in the output speech. These "smooth holes" are regions where the output speech decays smoothly to zero within ten to twenty output samples.

A solution to this lack-of-excitation problem can be found by employing the previous excitation in the pitch buffer. Because the pitch lag data is quasi-stationary, the overall pattern of excitation is also quasi-stationary, and the pitch buffer can be reused several times by playing out its contents using a modulo-pitch period counter. The resulting output speech is based solely on the "clean" (i.e., nonerroneous) excitation in the pitch buffer. This action also prevents any artifacts from getting into the long term pitch buffer from where they would propagate until a silent period is encountered. Furthermore, the pitch predictor tap is set at a stable value of 0.85, which will provide continuity of sound over several frames, but ultimately decay the output sound to zero should the fade last for a half-second or more. This is a valuable feature, since few would want to listen to a sustained vowel tone while stopped at a traffic light, e.g., "How are yoooooooooo. . . ", for the duration of the stop.

In keeping with the multiple-checksum-per-frame philosophy of the invention, a separate 6-bit checksum is employed for each excitation frame. This insures that short fades will only interrupt the excitation for a relatively short (e.g., 8 milliseconds) period of time, rather than the full 24 millisecond frame length.

An additional benefit of multiple checksums within a frame should be considered. If a very high random error rate is encountered, it is possible that checksum errors will be detected during every frame. If only one checksum were used to zero the pulse excitation, the result would be very little output sound from the speech decoder. Having multiple checksums decreases the probability that all three will fail during a given frame. Thus some excitation will make it through to the output LPC filter stage. The vocoder "evasive action" will not only provide improved performance during fades, but it will also help during periods of heavy random errors. This is a principle difference between the system incorporating the new algorithm and the aforementioned system described by Dal Degan et al.

The actions to be taken when checksums detect errors are given below. The complete system of the invention uses seven checksums: three 4-bit sums for the LSPF data, one 4-bit sum for pitch, and one 6-bit sum for each of the three excitation subframes. In each excitation subframe, only the three most significant bits of the pulse amplitudes are checked by the checksum. Thus, $3 \times 6 = 18$ bits are checked in each subframe.

Checksums 1, 2 and 3: LSPF data

1. If any one, but no more than one, of the LSPF checksums detects an error, then pass the detected LSPF bits directly to the LSPF decoding algorithm. The LSPF decoding algorithm will re-order the frequencies to assure stability, as given above.

2. If two or more of the LSPF checksums are in error, then replace the entire set of LPC coefficients with the most recent set received having less than two LSPF checksums in error. Continue using this set of coefficients until a new set with one or fewer errors is received.

Checksum 4: Pitch Lag

Use the most recently received error-free value in place of the corrupted one.

Checksum 5: Pulse Amolitudes, Subframe 1

1. Zero the six pulse amplitudes for subframe 1.
2. Set the pitch tap gain for subframe 1 to 0.85.

Checksum 6: Pulse Amplitudes, Subframe 2

1. Zero the six pulse amplitudes for subframe 2.
2. Set the pitch tap gain for subframe 2 to 0.85.

Checksum 7: Pulse Amplitudes, Subframe 3

1. Zero the six pulse amplitudes for subframe 3.
2. Set the pitch tap gain for subframe 3 to 0.85.

Figure 4:
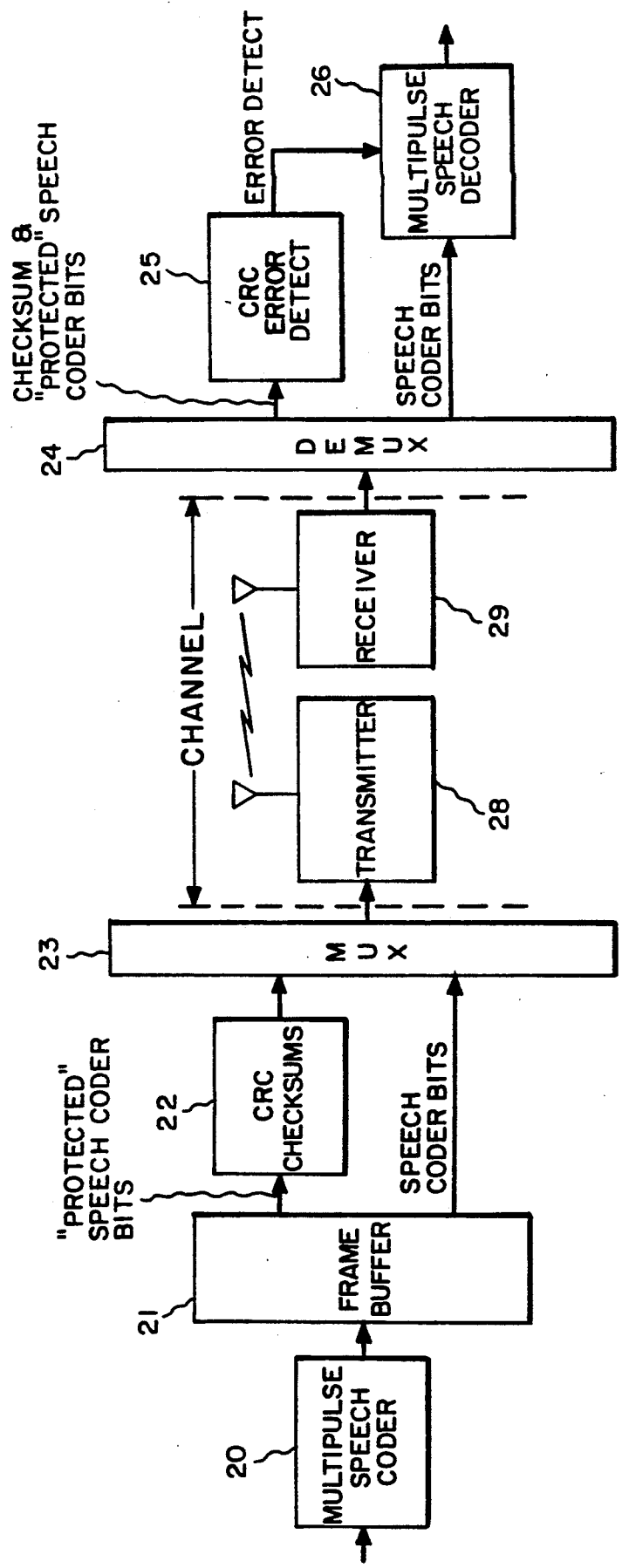
FIG. 4 is a block diagram illustrating an implementation of the invention.

The algorithm is implemented in the system shown in FIG. 4. A multi-pulse speech coder 20 of the type generally described in copending applications Ser. No. 07,353,855 and Ser. No. 07,353,856 provides a coded output to a frame buffer 21. The frame buffer supplies the bits of a coded frame into the several categories described above. Checksums are calculated for the "protected" bits by a CRC checksum generator 22. These sums are merged with the speech coder bits by a multiplexer 23 to form a frame which is transmitted from a transmitter 28 to a receiver 29 through a communications channel.

At the receiving station, the bits from receiver 29 are first separated into segments by a demultiplexer 24. the checksums and "protected" bits are supplied to a CRC error detector 25. A speech decoder 26 simultaneously receives the speech bits from demultiplexer 24 and error flag bits from CRC detector 25.

Figure 5:
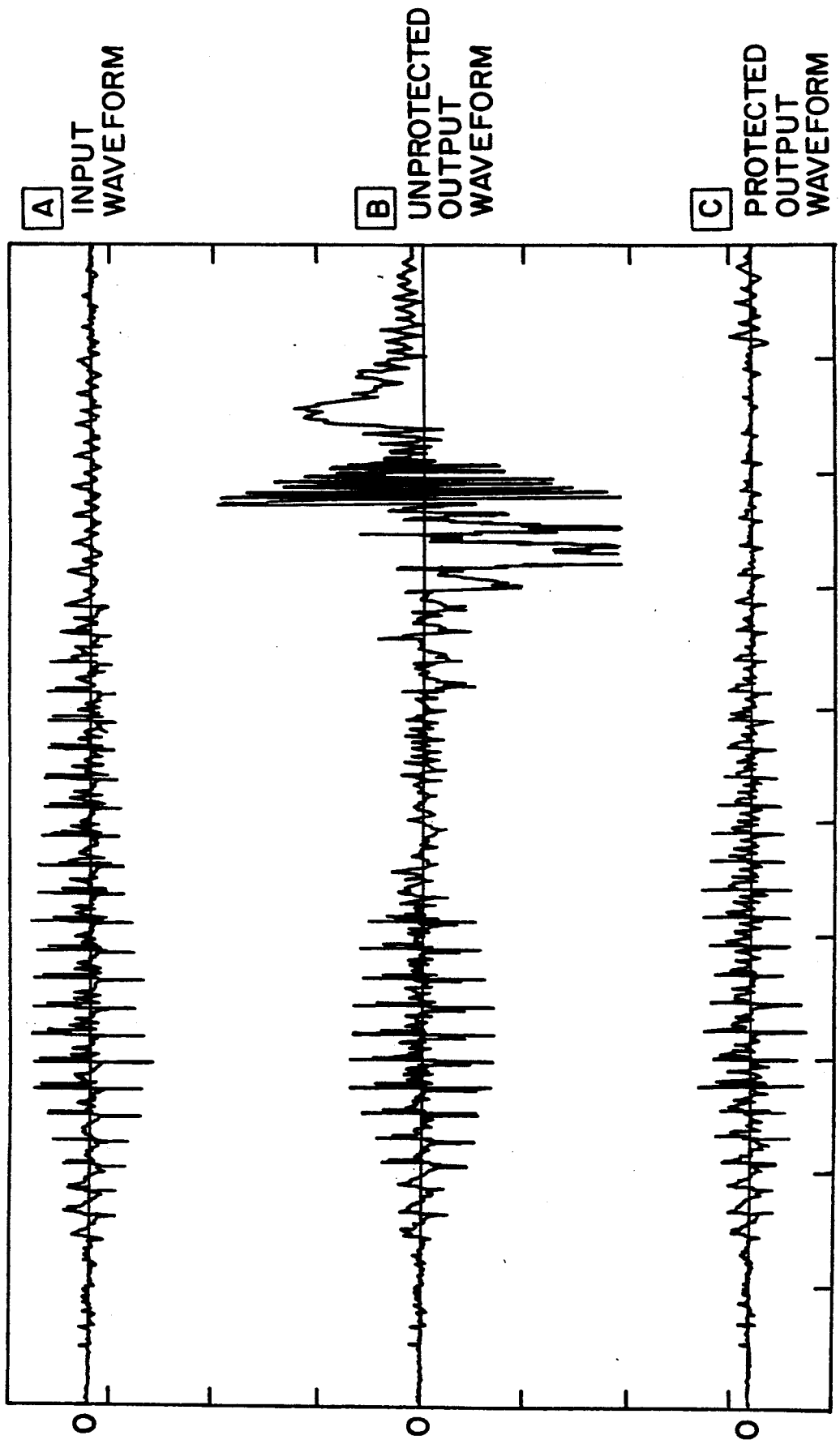
FIG. 5a is a graph showing a typical fading input signal.
FIG. 5b shows an output signal produced using the input signal of FIG. 5a by a conventional multi-pulse vocoder.
FIG. 5c shows an output signal produced using the input signal of FIG. 5a by the present invention.

Although the best method for evaluation of the results is through a listening test, a valid demonstration of performance can be obtained by examining the time-domain waveform of the output speech. FIG. 5 shows the system results for the word "town" in a simulated digital cellular environment (850 MHz carrier, 48 kilobits/second 3-slot time division multiple access (TDMA) transmission in a vehicle moving at 5 milesper-hour). Trace A shows the input waveform, trace B shows the output waveform of the speech decoder with no detection/regeneration, and trace C shows the output waveform of the system with detection/regeneration. The protected output waveform can be seen to be free of the large-amplitude artifacts present in the unprotected output waveform.

Performance of the protection scheme according to the invention may also be measured by the signal-to-noise ratio (SNR) for unprotected and protected coders operating in the same environment. Table 2 shows the results for the same environment as used in generating the graph of FIG. 5. These measurements were taken over 17.5 seconds of mixed male and female speech.

TABLE 2

| SNR (dB) for Unprotected and Protected Coders 6% average BER; 850 MHz 3-slot TDMA; 5 mph | | |
|---|---|---|
| Unprotected | Protected | Improvement |
| −1.78 | +3.23 | +5.01 |

While analyzing Table 2, it should be noted that absolute SNR values do not indicate the quality of the output speech. The important number is the difference between the protected and unprotected SNR, and Table 2 shown a 5 dB improvement over the unprotected system.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for protecting a multi-pulse speech coder from fading and random pattern bit errors comprising the steps of:
    encoding speech as a plurality of subsets of line spectrum pair frequency coefficients, pitch lag data, pitch gain data, and pulse amplitude and position data;
    generating separate checksums for each subset of the line spectrum pair frequency coefficients, pitch lag data, pitch gain data, and pulse amplitude and position data;
    combining said separate checksums with said line spectrum pair frequency coefficients, pitch lag data, pitch gain data, and pulse amplitude and position data to comprise a frame; and
    transmitting said frame to a receiver.

2. The method recited in claim 1 wherein said frame includes seven checksums, three of said checksums being allocated to the line spectrum pair frequency coefficients, one of said checksums being allocated to the pitch lag data and one of said checksums being allocated, respectively, to each of three subframes, respectively, of pulse amplitude and position data, each of said subframes also including pitch gain data.

3. The method recited in claim 2 further comprising the steps, performed at said receiver, of:
    receiving and detecting said frame;
    passing detected line spectrum pair frequency coefficients if none or any one, but no more than one, of the line spectrum pair frequency checksums signifies a detected error;
    transmitting data from a most recent line spectrum pair frequency coefficients having less than two detected errors received if two or more of the line spectrum pair frequency checksums are in error; and
    continuing to transmit the line spectrum frequency coefficients until a new line spectrum pair frequency coefficients with one or fewer errors is received.

4. The method recited in claim 3 further comprising the step of applying a consistency check to the line spectrum pair frequencies when one, but no more than one, of the line spectrum pair frequency checksums signifies a detected error so as to insure that line spectrum pair frequencies within a frequency set are increasing and are neither overlapping or so close so as to produce tonal artifacts in the output speech.

5. The method recited in claim 4 wherein said consistency check comprises the steps of:
    stepping through the line spectrum pair frequencies in a set thereof to identify adjacent line spectrum pair frequency coefficients that are either overlapping or so close so as to produce tonal artifacts in the output speech;
    separating by a minimum distance line spectrum pairs that are too close together in frequency; and
    replacing line spectrum pairs that overlap in frequency with their frequency values from a previous frame.

6. The method recited in claim 5 wherein said previous frame is comprised of said most recent usable data set.

7. The method recited in claim 2 further comprising the step, performed at said receiver, of using a most recently received pitch lap data having no checksum errors in place of currently-received pitch lag data to reconstruct a voice signal if the pitch lag data checksum signifies an error in said currently-received pitch lag data.

8. The method recited in claim 2 further comprising the steps performed at said receiver of:
    zeroing the pulse amplitude data for any one of said subframes for which the checksum allocated thereto signifies corruption thereof; and
    setting the pitch gain for said one of said subframes to 0.85.

9. The method recited in claim 2 further comprising the steps, performed at said receiver, of:
    passing detected line spectrum pair frequency data if none or any one, but no more than one, of the line spectrum pair frequency checksums signifies a detected error;
    reconstructing a voice signal from most recent received line spectrum pair frequency coefficients having less than two errors received if two or more of the line spectrum pair frequency checksums are in error, and continuing to reconstruct the signal from said line spectrum pair frequency coefficients until a new data set with one or fewer errors is received;
    using a most recently received pitch lag data having no errors in place of currently-received pitch lag data if the pitch lag data checksum signifies an error in said currently-received pitch lag data;
    zeroing the pulse amplitude data for any one of said subframes for which the checksum allocated thereto signifies corruption thereof; and
    setting the pitch gain for said one of said subframes to 0.85.

10. The method recited in claim 9 further including, when one, but no more than one, of the line spectrum pair frequency checksums detects an error, the step of applying a consistency check to the line spectrum pair frequency data to insure that frequencies within a set of line spectrum pair frequencies are increasing and are neither overlapping or so close so as to produce tonal artifacts in the output speech, said consistency check comprising the steps of:

stepping through the line spectrum pair frequencies in a subset thereof to identify adjacent line spectrum pair frequencies that are either overlapping or too close together;

separating by a minimum distance line spectrum pairs that are too close together in frequency; and replacing line spectrum pairs that overlap in frequency with their frequency values from a previous frame.

11. The method recited in claim 2 wherein the checksums allocated to the line spectrum pair frequency coefficients have a length of four bits, the checksum allocated to the pitch lag data has a length of four bits and the checksums allocated to each of the pulse amplitude data subframes each have a length of six bits, respectively.

12. A multi-pulse coding system for speech, comprising:

a multi-pulse speech encoder for encoding speech as line spectrum pair frequency data, pitch lag data, pitch gain data, and pulse amplitude and position data;

a checksum generator for generating separate checksums for each subset of the line spectrum pair frequency data, pitch lag data, pitch gain data and pulse and position amplitude data;

a multiplexer for combining said separate checksums with said line spectrum pair frequency data, pitch ,lag data, pitch gain data, and pulse amplitude and position data to comprise a frame; and means for communicating said frame to a decoding system.

13. A multi-pulse speech communication system comprising:

a multi-pulse speech encoder for encoding speech as line spectrum pair frequency data, pitch lag data, pitch gain data, and pulse amplitude and position data;

a checksum generator for generating separate checksums for the line spectrum pair frequency data, pitch lag data, pitch gain data and pulse amplitude and position data;

a multiplexer for combining said separate checksums with said line spectrum pair frequency data, pitch lag data, pitch gain data, and pulse amplitude and position data to comprise a frame;

a receiver;

a transmitter for transmitting said frame to said receiver;

a demultiplexer for extracting the line spectrum pair frequency data, pitch lag data, pitch gain data, pulse amplitude and position data and said checksums from said frame;

a cyclic redundancy code CRC error detector for receiving said extracted bits and generating error flags when errors are detected; and a multi-pulse speech decoder responsive to said error flags for correcting said line spectrum pair frequency data, pitch lag data and pulse amplitude and position data in the received frame.

14. A method for speech transmission comprising the steps of:

analyzing the input audio signal in a multi-pulse speech coder to create a set of line spectrum pair frequency coefficients characteristic of the shape of the original audio signal;

analyzing the input audio signal in a multi-pulse speech coder to create pulse amplitude data, pulse position data and pitch tap gain data to define a series of pulses to be applied in conjunction with the set of line spectrum pair frequency coefficients;

buffering the line spectrum pair frequency coefficients and pulse amplitude data; pulse position data and pitch tap gain data, called buffered data, in a frame buffer;

selectively sending portions of the line spectrum pair frequency data and pitch tap gain data, called the protected data, from the frame buffer to the checksum generator to create checksums for the protected data, information remaining in the buffer is called unprotected data;

sending the unprotected data along with the protected data and the checksums to a multiplexer that organizes and constructs a frame from the unprotected along with the protected data and the checksums;

sending the frame to a transmitter that transmits the frame via radio signals;

sensing the transmitted frame with the use of a receiver;

sending the frame to a demultiplexer that disassembles the frame into checksums, unprotected data, and protected data, namely portions of the line spectrum pair frequency coefficients, pulse amplitude data, pulse position data and pitch tap gain data;

selectively sending the checksums to the CRC error detector that analyses the checksums to determine if a transmission error occurred, and which data was corrupted;

sending the line spectrum pair frequency coefficients, pulse amplitude data, pulse position data and pitch tap gain data from the demultiplexer to the multi-pulse speech decoder to reconstruct the original audio signal by using a series of pulses defined by the pulse amplitude data, pulse position data and pitch tap gain data to stimulate an active filter employing the set of line spectrum pair frequency coefficients, to produce a transfer function having the shape of the original audio signal, the multi-pulse speech decoder also receiving signals from the CRC error detector and the multi-pulse speech decoder selectively incorporating the line spectrum pair frequency coefficients, pulse amplitude data, pulse position data and pitch tap gain data based upon their corresponding CRC errors in reconstructing the original audio signal.

* * * * *